May 4, 1954 A. V. BEDFORD 2,677,720

COLOR TELEVISION SYSTEM

Filed Sept. 23, 1949 4 Sheets-Sheet 1

INVENTOR
Alda V. Bedford
BY
ATTORNEY

May 4, 1954 A. V. BEDFORD 2,677,720

COLOR TELEVISION SYSTEM

Filed Sept. 23, 1949 4 Sheets-Sheet 2

INVENTOR
Alda V. Bedford
BY
[signature]
ATTORNEY

May 4, 1954 A. V. BEDFORD 2,677,720

COLOR TELEVISION SYSTEM

Filed Sept. 23, 1949 4 Sheets-Sheet 3

INVENTOR
Alda V. Bedford
BY
[signature]
ATTORNEY

INVENTOR
Alda V. Bedford
BY
Olin C. Mitchell
ATTORNEY

Patented May 4, 1954 2,677,720

UNITED STATES PATENT OFFICE 2,677,720

COLOR TELEVISION SYSTEM

Alda V. Bedford, Princeton, N. J., assignor to Radio Corporation of America, a corporation of Delaware Application September 23, 1949, Serial No. 117,368

30 Claims. (Cl. 178—5.2)

The present invention relates to time multiplexed signal transmission methods and apparatus and more particularly, although not necessarily exclusively, to improvements in time multiplexing methods and arrangements for transmitting color television signals.

More directly, the present invention deals with band width reducing circuit methods for color television systems which employ the sequential sampling or modulation of color information from a plurality of individual color channels.

There have in the past been proposed a variety of methods and arrangements for transmitting color television information. In most of these systems, with particular reference to the tri-color variety in which three additively primary color records are utilized, an effort has been extended to reduce the required band width under that normally required for three separate standard black and white television channels, while retaining an effective image definition comparable to that obtainable in a conventional black and white system. More recent considerations of the commercial aspects of color television have, however, indicated the desirability of providing a composite color television signal which, when subjected to radio transmission, would demand a channel width not in excess of the present 6 mc. width allotted to standard black and white television transmission, including of course the accompanying sound. In addition, it is considered almost necessary that, to be acceptable, the method of color transmission be compatible with existing standard black and white television receivers, that is, the transmitted color signal be receivable by standard black and white receivers to produce a panchromatic type image which exhibits little evidence of being based on a color transmission signal.

Due to the restricted 6 mc. bandwidth of black and white television channels which permits transmission of only 4.2 mc. video signal with accompanying sound, it has been believed that considerable sacrifice in color picture definition would be necessary. Time division multiplexing arrangements which sequentially sample and transmit over a single channel on a pulse basis, bits of information from the three color channels, green, red and blue normally employed in color television systems, have provided reasonably good results in the obtaining of a reduced bandwidth high definition tri-color television system. By way of example, in such time multiplexing arrangements, there are generally established at the transmitter station three separate color channels, each fed by the output of a separate color camera. Each color camera is in turn made responsive to a different one of three additively primary color components of the color image to be transmitted. A commutating or electrical sampling mechanism is then provided for sequentially sampling the individual outputs of these three color channels at some predetermined sampling rate. The output of the sampling mechanism therefore comprises a series of pulses divisible into groups of three, the amplitude variations of each pulse of a given group of course corresponding to the light intensity variations of the color component it represents. The most basic color television receiving apparatus for this system is obviously the inverse of the transmitter in its operation. After the series of multiplex pulses are demodulated from the transmitter carrier, they are applied to a commutator or signal sampling circuit substantially the same as that employed in the transmitter. The receiver commutator is then held in synchronism with the transmitter commutator so that it provides at each of three separate output terminals pulses corresponding to only one particular transmitter color channel. Three receiver color channels each terminating, for example, in a kinescope, are then respectively fed by a suitable group of the separated color pulses provided by the receiver commutator. The images on the three kinescopes are given suitable color hues by those of a suitable phosphors or by filters corresponding to the three colors of the transmitter channels. The monochrome color records thus produced are then optically combined with one another to form a complete television color image.

Inasmuch as the higher frequency components establishing picture detail in each of the color channels are, in accordance with such time multiplexing systems, submitted to electrical sampling, it is generally accepted that the possible reproducible picture detail in each color is restricted to a value not more than ½ the frequency at which the individual color channels are sampled. Since the sampling rate is in turn restricted by the available 6 mc. bandwidth allotted to the transmission of both the color video signal and sound signal, it is easily seen that the definition of the basic time multiplex color television system is inherently limited.

To overcome this inherent limitation embodied by such a basic time multiplexing system, it has been proposed to provide means for reducing the image repetition rate by horizontally interlacing the primary color elements of the color image along each line of the color image raster to reduce the apparent flicker of the lower image repetition rate. With such a system, as described more fully in a copending U. S. patent application by Randall Ballard, Serial No. 117,528, filed September 24, 1949, entitled "Color Television System," the degree of visual picture detail may within limits be virtually multiplied by the number of times an individual line is interlaced. For instance, in a time multiplexed tri-color television system not employing interlacing along the lines but utilizing a channel sampling or commutating rate of 2 mc. for each color, while the bandwidth of each channel sampled is 4 mc., the effective definition of the reproduced color image would be restricted to 1 mc. for a frame presentation rate of 30 complete color frames per second. If, however, the individual color elements of the tri-color system are interlaced along the horizontal lines making up the color image raster on a two-to-one basis, the effective visual definition of the color image will be increased to 2 mc. while frame presentation rate will be reduced to 15 complete color frames per second thereby decreasing the flicker rate.

It is a purpose of the present invention to provide a method and apparatus for still further improving the effective image resolution in a time multiplex color television system.

It is another purpose of the present invention to provide an improved method and apparatus for carrying out the time multiplexing of a tri-color television system so that the elementally sequential formation of the color television image will display a visual definition equivalent to color signal components having frequencies substantially above ½ the sampling rate of the time multiplexing system.

It is still a further purpose of the invention to provide a novel method and apparatus for carrying out time multiplexing of a tri-color television system whereby the generated color television signal is not only compatible with existing black and white television receiver but the effective definition of the image when produced in monochrome in such black and white receivers will be greatly enhanced.

A still further object of the present invention resides in the provision of an improved method and apparatus for increasing the effective signal to noise ratio of composite color signals.

In the realization of the above objects, the present invention contemplates the separation or division of the individual color channels of the time multiplexing system into low and high frequency components and restricting the sequential sampling of the channels to only the low frequency components thus provided. The high frequency components of the channels are then utilized to form what will hereinafter be called an image detail signal which, in effect, is made to by-pass the signal sampling process at the transmitter. Therefore, the higher signal frequencies defining the detail of the reproduced color image will not be deleteriously influenced by the time multiplexing sampling of the color channels. The resulting image detail from the high frequency components of one or more of the signal channels act to quite faithfully depict the image detail in all of the color channels as explained in more detail in a U. S. Patent No. 2,554,693 filed December 7, 1946, and issued in name of A. V. Bedford and entitled "Simultaneous Multicolor Television," in which it is pointed out that the color sensitivity of the human eye is reduced when viewing small areas of illumination. This permits the image detail of a color television image to be quite accurately presented through the agency of a single color channel (preferably the green) or otherwise represented by concomitant high frequency intensity modulation of all the color channels in accordance with a single set of high frequency components designated, for example, as the picture-detail signal.

Although the advantages of the present invention are in no way restricted to the use of the particular form of color television receiver, it has other noteworthy features when used in connection with color receivers of special complementary design. For example, if the above-described basic color television receiving apparatus is altered in accordance with the novel disclosure of my copending U. S. patent application, Serial No. 117,618, entitled "Color Television System," filed September 24, 1949, there will result a virtual elimination of the dot structure produced by the time multiplexed sampling in the color reproduction of substantially black and white subjects. By way of example, although in no way related to the present invention, this complementary color television receiving system provides means for restricting the bandwidth of each of the above-described basic television receiver color channels to a value well below the sampling rate. By means of filter networks, the high frequency image detail signal transmitted by the transmitter in accordance with the present invention is extracted from the received demodulated signal prior to the sampler and by means of an adder circuit combined with the output of one or more of the receiver color channels posterior to the sampler and before applying the channels to their respective kinescopes. As brought out more clearly in my above-referenced copending application, this arrangement tends to not only increase the overall definition of the reproduced image above that otherwise obtainable but the actual brightness of the color image may be increased over that of conventional color receiving systems. Furthermore, when used with the above special form of color receiver, the dot structure of the image in general is greatly reduced.

It is therefore a still further object of the present invention to provide an improved method and apparatus for transmitting color television signals which, in addition to having all of the advantages hereinabove set forth, makes possible the virtual elimination of commutative dot structure in the image, a several fold increase in image brightness and a marked increase in picture definition when used in connection with a special color receiver of complementary design as described more fully in my U. S. patent application, Serial No. 117,618, entitled "Color Television System," filed September 24, 1949.

A more complete understanding of the operation of the present invention, as well as many other objects and features of advantage thereof will become apparent through the reading of the following specification, especially when taken in connection with the accompanying drawings:

Figure 1 is a block representation of a single transmission system embodying the novel features of the present invention;

Figure 2 diagrammatically illustrates one form of horizontal image element or dot interlacing system which may be used in connection with the present invention;

Figure 3 further illustrates the interlacing system of Figure 2;

Figure 1:
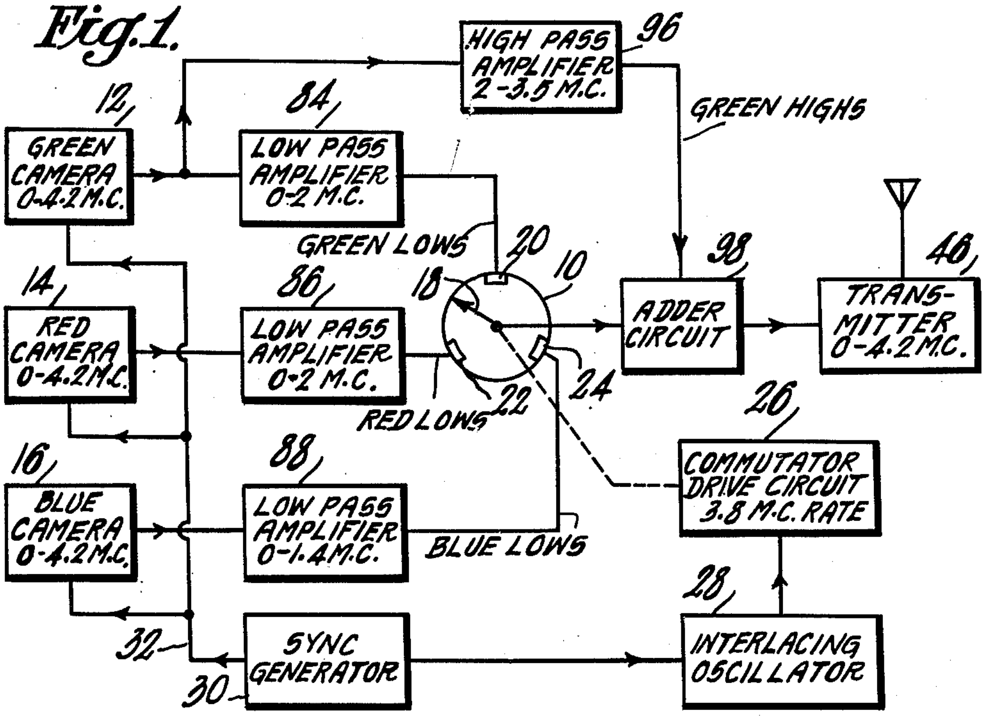

Considering now the arrangement shown in Figure 1, it is seen to be in essence with the exception of the novel features of the present invention hereinafter to be described, nothing more than a basic time multiplexing system for producing tri-color elemental sequential television signals of a type briefly described hereinabove. Time multiplexing involves channel selection and channel selector apparatus in the form of a signal sampling or commutating device represented by the symbol 10, well known to those skilled in the art is arranged for sequentially sampling the output of the three color channels following the green, red and blue television cameras 12, 14 and 16. Symbolically the sampling device 10 is shown provided with a rotating armature 18 which, as it rotates, electrically contacts the terminals 20, 22 and 24, each bearing respective signals from the green, red and blue camera channels. The frequency at which the commutation sampling or selection of the color channels takes place is determined by the commutator drive circuit 26. The drive circuit 26 is, through an interlacing oscillator 28 (later to be described), synchronously controlled by the television system sync generator 30 in order to keep all elements of the television system in synchronism with one another. The sync generator 30 is further adapted via path 32 to apply synchronous control to the red, blue and green cameras 12, 14 and 16. By way of example, the commutator drive circuit has been indicated as effecting a sampling rate of 3.8 mc. for each color. This sampling or commutation rate is not in any way critical, but may assume a variety of values, that indicated being illustrative of only one value which is permissibly employed.

Figure 4:
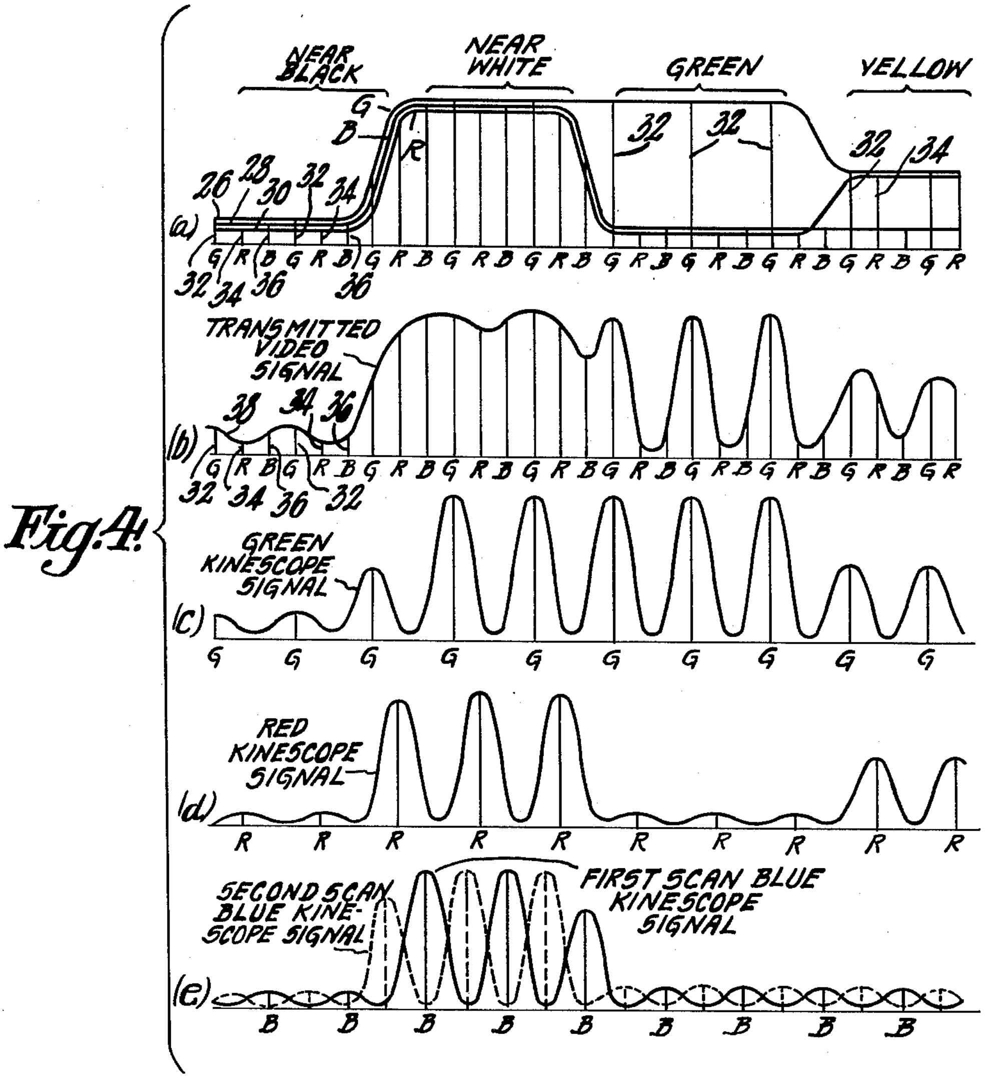
Figure 4 illustrates several wave forms found useful in understanding the operation of the arrangement of Figure 1.

Before dealing in more particularity with these aspects of Figure 1 involving the present invention, the manner in which the basic time multiplexing system embraced thereby operates to provide a tri-color elemental sequential television signal may be best first considered. Such a basic multiplexing system is the same as Figure 1 with, however, the high pass filter 96, adder circuit 98, and the low pass characteristics of the amplifiers 84, 86 and 88 absent, these elements of the figure being peculiar only to the practice of the present invention later to be described in full detail. Assuming then the appearance of green, red and blue color signals at the terminals 20, 22 and 24 of the sampling device 10, the output available at the armature 18 of the sampling device will comprise a plurality of pulses having a recurrence frequency of three times that of the 3.8 mc. sampling rate or 11.4 mc. In Figure 4*a*, there are illustrated by the curves 26, 28 and 30 respectively the video signals appearing at the terminals 20, 22 and 24 of the commutator 10 under the conditions of a near black color area, a near white color area, a green color area, and a yellow area as scanned by the green, red and blue cameras 12, 14 and 16. The commutator armature 18 will then sequentially sample the signals appearing at the terminals 20, 22 and 24 during intervals corresponding to the periods 32, 34 and 36 in Figure 4*a*, which sampling provides pulsed color information at the output of the commutator corresponding to the green, red and blue channels. The amplitude of the pulses delivered by the commutator will therefore be defined by the actual amplitude of the signal appearing at the terminal being sampled. For sake of convenience, all of the green sampling pulses 32, whose peak amplitude is defined by the green signal applied to terminal 20 of the commutator, is designated by the letter G. The red and blue pulses 34 and 36, whose amplitude is defined by the curves 28 and 30, are correspondingly designated as R and B pulses. Thus, for near black signals, all of the green, red and blue components, as shown, will have a very low amplitude so that the amplitudes of the G, R and B sampling pulses will be correspondingly low. The curve in Figure 4*b* illustrates the appearance of the sampling pulses of the commutator 10 after the high frequencies have been cut off by the low pass filter characteristic of the transmitter. The curve 38 connecting the peaks of the green, red and blue pulses of course will indicate the envelope of the transmitted video signal. For a near white signal, where the green, red and blue components are relatively high, all of the green, red and blue sampling pulses will of course increase proportionately. For a green signal, of course, the amplitude of the red and blue components, will drop considerably as shown, to leave a preponderance of high amplitude green pulses 32. Correspondingly, for a yellow signal, the amplitude of the blue sampling pulses would drop leaving a preponderance of green and red pulses 32 and 34 respectively. The waveform in Figure 4*b* defined by the pulses will be transmitted by the amplitude modulated transmitter 46 for reception by a color television receiver such as shown, for example, in Figure 5 or a black and white television receiver for monochrome reproduction of the color image as shown, for example, in Figure 9. As will be more apparent hereinafter, the curves 4*c*, 4*d* and 4*e* respectively represent the green, red and blue signal components of the composite wave 4*b* when commutated and filtered for application to separate kinescopes in a color television receiver.

Figure 5:
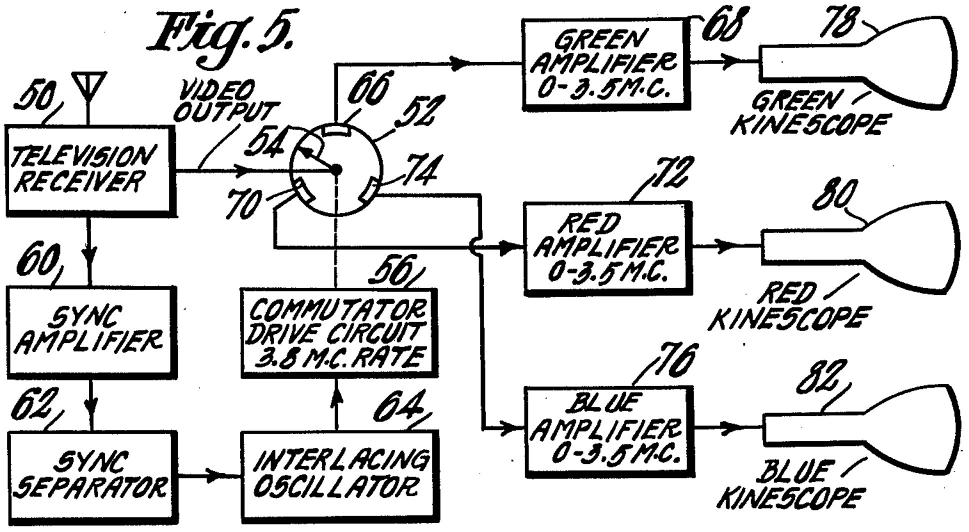
Figure 5 illustrates by block diagram a basic conventional time multiplexed color television receiver which responds to the advantages of the present invention as set forth in Figure 1.

Considering now the color reproduction of the signal shown in Figure 4*a*, the over all video signal transmitted by the transmitter will appear as shown in Figure 4*b* and it is this waveform 38 in Figure 4*b* that will be received and demodulated by the television receiver 50 in Figure 5. This combined waveform will, of course, appear as the video output of the television receiver and it is accordingly applied to another commutating or sampling device 52 substantially the same as that shown as 10 in Figure 1. The armature 54 of the commutating device is driven by commutator drive circuit 56 at the same commutating or sampling rate as the commutator drive rate of the transmitter, which in the case of Figure 1 was, for example, given as 3.8 mc. Exact synchronism would, of course, be necessary between the receiver commutator drive circuit 56 in Figure 5 and the commutator drive circuit 26 in Figure 1, this being easily accomplished by controlling the commutator drive circuit 56 in the receiver from synchronous signals communicated by the sync separator 62 of the television receiver. Since it is well known in the art that the synchronizing signals normally communicated by the television transmitter carrier are, in fact, timed by the system master sync generator such as 30 in Figure 1, means for adding synchronizing signals to the transmitter of Figure 1 have not been shown.

The receiver sync separator 62 will then control the commutator 52 through the interlacing oscillator 64. The importance of the interlacing oscillator 64 in the receiver of Figure 5 and the interlacing oscillator 28 in the transmitting circuit of Figure 1 will be considered hereinafter. In any event, it shall be considered that the armature 54 of the receiver sampler 52 travels in exact synchronism with the armature 18 of the transmitter sampler or commutator 10.

Thus when the transmitter commutator armature 18 is contacting terminal 20, thereby to submit a green sample or pulse for transmission, the armature 54 of the receiver commutator 52 is in contact with the terminal 66 connected with the green channel receiver amplifier 68. Terminal 70 of the receiver commutator 52 therefore corresponds to the red channel and is connected to the input of the receiver red channel amplifier 72. Terminal 74 of the receiver commutator 52 of course will provide commutation of the blue pulse and is therefore connected to the blue channel amplifier 76 of the receiver. Green, red and blue kinescopes 78, 80 and 82 or other image reproducing devices are respectively connected with the outputs of the green, red and blue receiver amplifiers 68, 72 and 76. Since the amplifier cut-off frequencies are substantially 3.5 mc. and the sampler frequency is 3.8 mc., the kinescopes will not be subjected to the sampling frequency but will remain continuously on in any large picture areas having uniform brightness. Some suitable optical means (not shown) will, of course, be provided for combining the images reproduced by the green, red and blue reproducing devices to produce the complete color image. The waveform applied to the respective kinescopes 78, 80 and 82 as produced at the output of the amplifiers 68, 72 and 76 are shown in Figures 4*c*, 4*d* and 4*e*.

Since it is considered a rather fast rule in the art of time multiplexing that the highest channel frequency faithfully representable by a series of sampling pulses shall not be more than one-half the rate at which sampling of the channel carrying that frequency is carried on, the highest frequency to be reproducible by the kinescopes 78, 80 and 82 in Figure 5 would be substantially one-half of the 3.8 mc. sampling rate or 1.9 mc. Since it is well known that high frequency components of a television signal described the visual detail of the image, it can be seen that the actual detail producible by this system would be inferior to the 4 mc. detail available in present day black and white transmission and receiving systems. However, as pointed out hereinabove, by providing some system for horizontal interlacing, it has been shown that the effective visual definition of the system may be increased at the expense of a lower frame presentation rate.

Figures 2, 3:
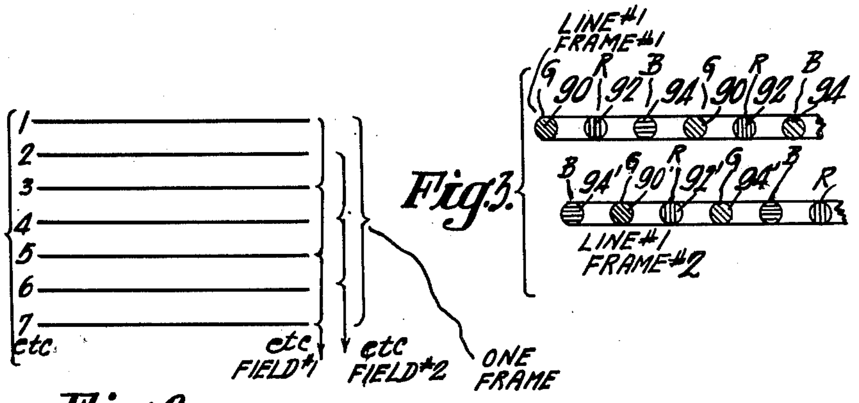

An exemplary form of horizontal interlacing although described in more detail in the above referenced U. S. patent application by Randall Ballard is briefly illustrated in Figures 2 and 3. Figure 2 illustrates a conventional form of raster produced by an accepted standard of vertical interlacing, namely lines 1, 3, 5 and 7, etc. are laid down on the kinescope 78, 80 and 82 by the first field or vertical scansion of the kinescopes, whereas lines 2, 4, 6 etc. will be laid down by the second field or vertical scansion of the kinescopes. To illustrate one form of permissible color dot interlace Figure 3 shows the manner in which line 1 of the raster of Figure 2 is scanned during two different fields. During the first frame, and at the beginning of field 1 of that frame, line 1 is scanned simultaneously in all of the green, red and blue kinescopes 78, 80 and 82. However, as the deflection of the electron beam progresses in the three kinescopes, the electron beams in the respective tubes are successively turned on in the green, red and blue sequence corresponding to the supply of information to the green, red and blue channels from the receiver commutator 52 in Figure 5. Hence in Figure 3, line 1 of frame 1 as produced by the receiver of Figure 5, would be made up of the green image element color dots 90 produced by the kinescope 78, the red picture element color dots 92 produced by the red kinescope 80 and the blue image element color dots 94 reproduced by the blue kinescope 82. As shown, the individual image element color dots are separated by space substantially equal to the width of a color dot. It is noted that for convenience, the elemental color dots making up the line are shown as circular but in practice due to the actual movement of the beam it is clear that they would not assume the perfectly circular form shown.

The second time line 1 is scanned which occurs at the beginning of the third scanning field shown in the lower sequence of dots 94′, 90′ and 92′ in Figure 3, and as described more fully in the above referenced U. S. patent application by Randall Ballard, the phase of the commutator 10 in the transmitter of Figure 1 and the commutator 52 in the receiver of Figure 5 has been shifted through the simultaneous influence of the interlacing oscillators 28 and 64 in the transmitter and receiver respectively. This interlacing oscillator operates at approximately one-half line frequency and accomplishes a shift of virtually 180° so that the color samples of the second scansion of line 1 at the beginning of the third field (shown at the bottom of Figure 3) will fill in the spaces between the color dots set forth along line 1 at the beginning of frame 1 (shown in the upper portion of Figure 3). This dot interlacing action due to the rather long persistence of the eye in viewing the scanning of line 1 is virtually the electrical equivalent of producing twice as many individual color elements in line 1 which, as shown in Figure 4*e* corresponds to a sampling rate of substantially twice that of 3.8 mc. Inasmuch as each of the lines of the raster is similarly dot interlaced, it is apparent that the effective picture definition will be almost twice that otherwise permitted by the 3.8 mc. sampling rate. That is to say, where as heretofore described, the definition in any one color without dot interlacing was limited to 1.9 mc. (one-half of 3.8 mc.) it would now tend to be increased to 3.8 mc.

Even though this dot interlacing technique does provide an improvement in color picture detail, it is manifest that the quantity of detail information presented in the picture depends upon the relative proportion of the color components in the picture. For instance, if the transmitter in Figure 1 were transmitting a picture having relatively little red and blue components, the amount of picture detail information carried by the transmitted red and blue sampling pulses would be relatively low. In the limit where both the red and blue components were entirely absent only picture detail information corresponding to the green channel would be represented. This would mean that the light intensity of the frequency picture detail components would be produced by only the green kinescope, leaving the red and blue kinescopes standing idle.

In accordance with the present invention, however, this characteristic is obviated by transmitting high frequency picture detail over the transmission channel at all times regardless of the apportionment of the primary colors comprising the picture. An arrangement for accomplishing this is shown in Figure 1. Since the eye has a greater acuity for green than for red and blue, the high frequency components of the green camera 12 are allowed to pass through the high pass circuit 96 and combined with the output of the transmitter commutator 10 by means of the adder circuit 98. Thus regardless of the presence of the red or blue color components the high frequencies which dictate the detail of the image will be reproduced over the transmission channel at all times. The receiver in Figure 5 will then have high frequency information for reproduction by the red and blue kinescopes regardless of red or blue color components. Since it has been shown that the eye has difficulty in determining the actual color of very small illuminated areas this red and blue high frequency information will act to improve the apparent detail in the picture even though it be a wholly green picture. The present invention, therefore, in effect increases the transmission efficiency of high frequency picture detail information by bypassing the high frequency components around the commutator or sampling device in the transmitter proper. By by-passing the sampling device per se, it is further apparent that the highest picture detail signal to be transmitted is no longer limited by the sampling rate. For this reason, the present invention will permit the full transmission of high frequency picture detail without, in fact, the need for dot interlace, as described above.

However, it can be shown that in the receiver of Figure 5, the transmitted image detail signal of the present invention tends to heterodyne with the sampling frequency of the commutator 52 to produce unwanted low frequency components. Although these low frequency components are rather small in amplitude, it is found that the use of line or dot interlace, as for example described above, tends to visually cancel the effects of these low frequency components. This is probably due to the fact that these "false" low frequency components appear on either side of a color picture element so that interpositioning of the interlaced dot elements provides cancellation of the low frequency disturbance. The phase of such low frequency disturbance can be shown to be such as to allow this effect.

In the practice of the present invention, it is sometimes desirable to limit the highest image detail ferquency combined with the output of the transmitter sampler 10 in Figure 1 to a value less than the sampling rate. This will prevent any other undesirable low frequency difference frequency components from being generated in the receiver sampling device 52 in Figure 5. The tendency of this generation of low frequency components comes about by way of the fact that the sampling device itself constitutes a highly non-linear transmission circuit so that undesirable low beat frequencies could be produced between the 3.8 mc. sampling rate and any high frequency component about 3.8 mc. i. e. sideband components can result from modulation of the sampler frequency by the signal frequencies. Likewise, sideband components can result from modulation of the frequency of the sampler 10 at the transmitter by the outputs of low-pass amplifiers 84, 86 and 88, so that such sideband components, together with the frequencies pass by the amplifiers, appear in the output of the sampler. In practice, it is found sometimes desirable to restrict the high frequency components actually applied to the transmitter sampling device 10. This is accomplished in Figure 1 by the low pass amplifiers 84 and 86 cutting off at 2 mc. and amplifier 88 cutting off at 1.4 mc. The high pass circuit 96 is then assigned a pass band of 2–3.5 mc. which embraces the high frequency components not passed by the low pass amplifiers 84 and 86 but restricts the high frequency components to a value less than 3.8 mc. As pointed out above, the highest frequency faithfully reconstructable by 3.8 mc. sampling pulses is thought to be 1.9 mc. so that provision of a band pass in excess of say 1.9 mc in the amplifiers 84, 86 and 88 would be only in effect trying to force the transmission of electrical signal information through the sampler over these channels which theoretically cannot be reproduced by the pulses provided by the sampler. Furthermore, the restricted 4.2 mc. bandwidth of the transmitter would indicate a suppression of individual channel detail components to one-third 4.2 mc. or 1.4 mc. An effort to go beyond 1.9 mc. then appears to force operation into a zone where deleterious distortion products may be generated whereas restriction of the high frequencies applied to the sampler reduces the possibility of generating such undesirable products.

Figure 6:
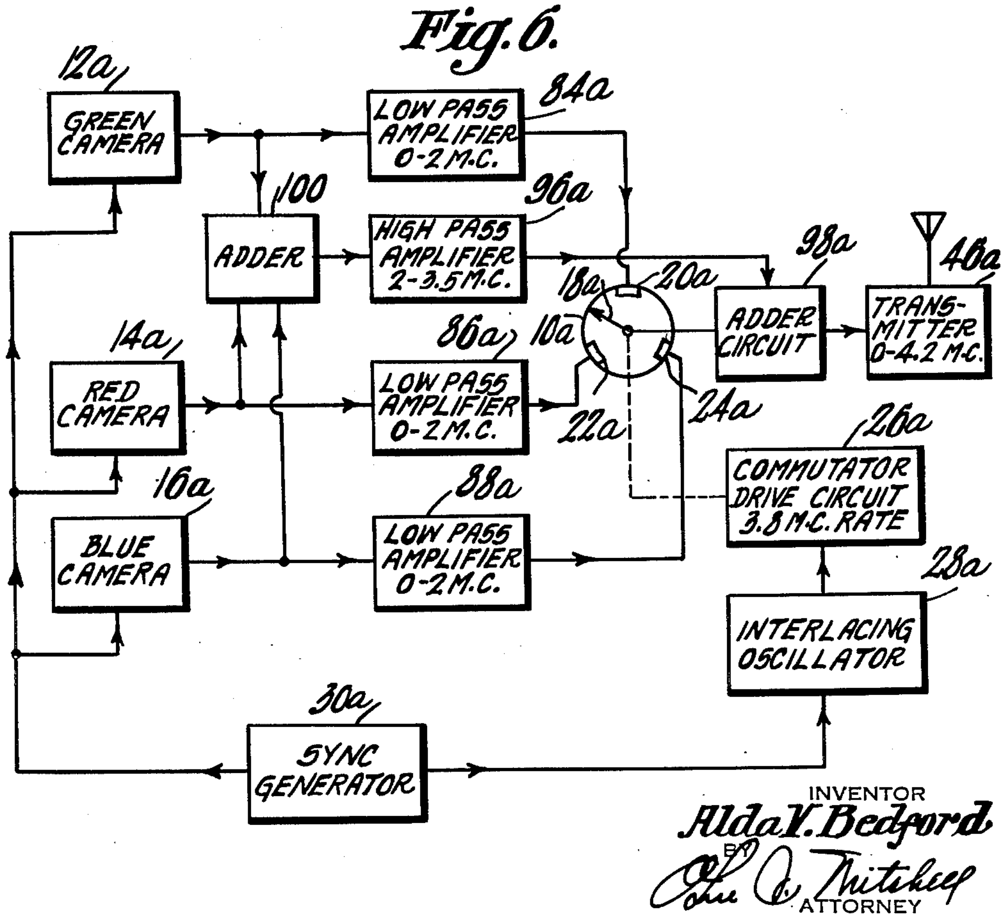
Figure 6 is another block diagram representation of color television time multiplex transmission system embodying still another form of the present invention.

In practice, it has further been found that the use of the present invention as shown in Figure 1 greatly increases the apparent signal to noise ratio in the transmitted color image as regards noise signal produced in the color camera channels. A further increase in signal to noise ratio over the arrangement of Figure 1 is possible in accordance with the present invention from the system shown in Figure 6. The transmitting arrangement is in general the same as shown in Figure 1 and like components have been assigned corresponding reference numerals followed by the subscript "*a*." In Figure 6, however, the image detail signal instead of representing only high frequency components of the green channel, comprises a composite of the high frequency signals from all the color channels. Thus the output of cameras 12*a*, 14*a* and 16*a* of Figure 6, are applied to an adder circuit 100 whose output is in turn applied to the high pass amplifier circuit 96*a* having characteristics identical to the circuit 96 in Figure 1. The output of the high pass amplifier 96*a* is accordingly applied to the adder circuit 98*a* which adds the high frequency image detail signal from the high pass amplifier 96*a* to the output of the sampler 10*a*. The fact that the high frequency components of all the channels have been added in the adder 10 permits the random noise in the three channels to accomplish partial cancellation, the adder circuit 100 merely combining the green, red and blue signals and dividing the resulting signal amplitude by a factor of three. This principle of noise reduction, of course, is well known in the case of diversity radio reception where three radio receivers are spaced apart from one another and arranged to receive a single radio carrier. In the case of Figure 6, the high frequency components of the green, red and blue channels being the same, the net image detail signal-to-noise-ratio is greatly improved by the cancellation of the random noise produced by the cameras. Obviously, the other advantages pointed out with respect to the system of Figure 1 will also be resident in the arrangement of Figure 6.

Figure 7:
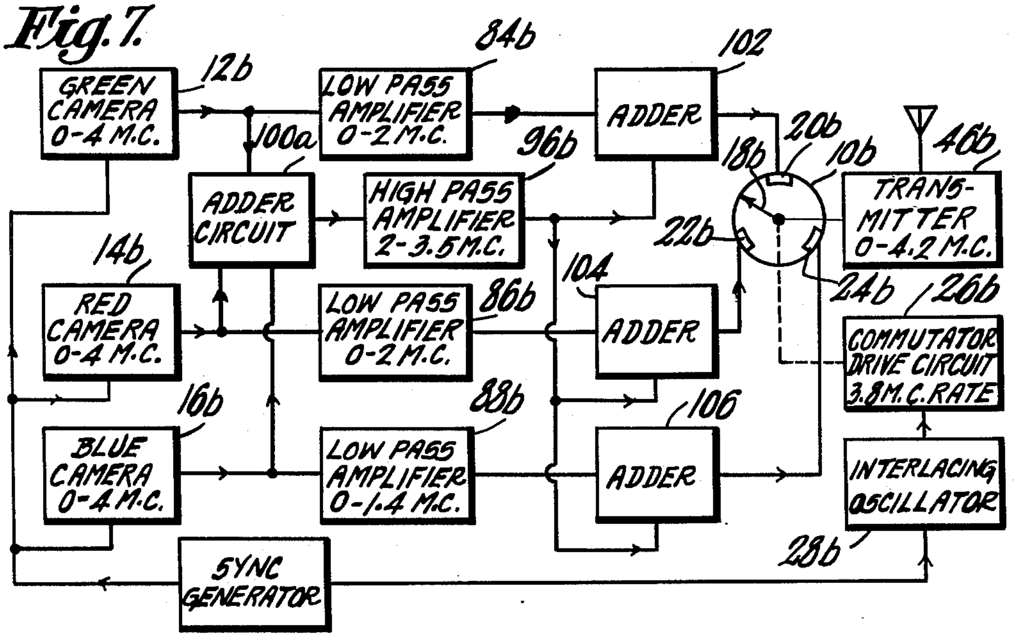
Figure 7 is another time multiplex tri-color television transmission system illustrated in block form and embodying still another form of the present invention.

A still further arrangement embodying the principles of the present invention is shown in Figure 7. Again in many respects, this arrangement is identical to those of Figure 1 and Figure 6 and like components have been assigned like reference characters in this case followed by the subscript *b*. As in Figure 6 to increase the signal to noise ratio in the image detail signal the "highs" of all three color channels are mixed and divided by a factor of three by the adder circuit 100*a*. The adder output signal, which is considered the image detail signal, instead of being applied to another adder circuit connected in the output of the sampler or commutator 10*b*, is on the contrary applied to three separate adder circuits 102, 104 and 106 respectively connected with the output of the green, red and blue low pass amplifiers 84*b*, 86*b* and 88*b*. The effect of this circuit is, of course, identical to that shown in Figure 6 with the exception that the actual transmission of the image detail component is here restricted to the sampling intervals of the sampling device 10*b*. In Figures 1 and 6, it was seen that the image detail signal was transmitted at all times regardless of the operation of the sampling device so that at first consideration, it would appear that the circuit of Figure 7 might restrict the high frequency components by the sampling rate of the commutator or sampler 10*b*. However, reflection will reveal that since the image detail signal applied to the adder circuits 102, 104 and 106 is, in fact, but a single signal, the high frequency components appearing at the terminals 20*b*, 22*b* and 24*b* of the commutator device 10*b* will all be in phase. Hence the sampling rate of high frequency components will be actually three times that of an individual channel, that is three times 3.8 mc. or 11.4 mc. As pointed out above, this will, of course, limit the highest frequency faithfully reproducible through the sampler to one-half 11.4 or 5.7 mc. Inasmuch as the channel provided by the transmitter 26*b* is 4.2 mc. wide, this restriction is of no moment.

Although in the embodiments of the invention shown in Figures 1, 6 and 7, the high pass filters 96, 96*a* and 96*b* for the image detail signal, whether comprising only green signal high-frequency components or mixed high frequency components from a plurality of the color channels, have been assigned an upper frequency limit of 3.5 mc., it is clear that this particular value is in no way critical and may be greater or lesser as desired.

Figure 8:
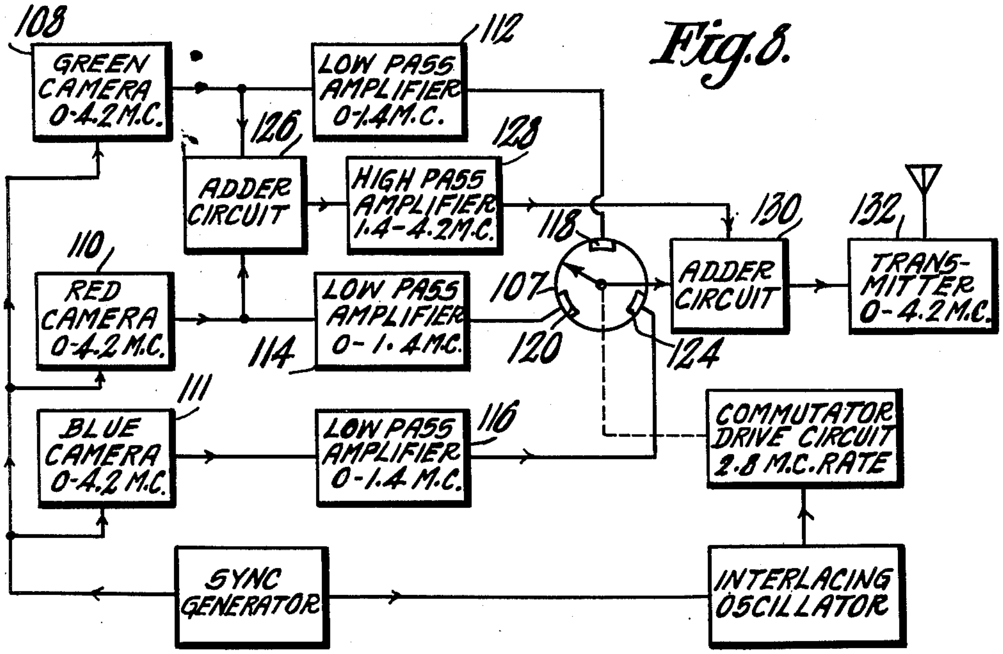
Figure 8 illustrates a time multiplex tri-color television system utilizing still another form of the present invention.

For instance, in the embodiment of the invention shown in Figure 8, the sampling rate of the commutator 107 is set at 2.8 mc. instead of 3.8 mc. as previously shown in connection with the commutators of other embodiments. In a manner similar to the other embodiments shown, the outputs of the green, red and blue cameras 108, 110 and 111 are respectively applied to low pass amplifiers 112, 114 and 116. The outputs of the low pass amplifiers are, in turn, applied to the commutating terminals 118, 120 and 124 of the commutator or sampler 107. High frequency components are then collected from the green and red channels and mixed by means of the adder circuit 126, and applied to the high pass amplifier 128 whose output is, in turn, supplied to the adder circuit 130 connected with the output of the sampler 107. In this arrangement, advantage is taken of the fact that the eye is less sensitive to the detail present in the blue color representations than in the green and red color representations. For this reason high frequency components are collected only from the green and red channels. Furthermore, the arrangement of Figure 8 inherently reduces the amount of cross talk with which the arrangements of Figures 1, 6 and 7 were forced to contend by virtue of high sampling rates of 3.8 mc. along with the restricted 4.2 mc. transmission channel.

The source of this crosstalk is immediately apparent when it is remembered that the highest transmitted pulse rate permissible over a time multiplexed circuit without producing crosstalk is equal to twice the band width of the transmission channel over which the pulses are to be communicated. Hence, in Figures 1, 6 and 7, the pulse rate being three times the 3.8 mc. sampling rate of the commutator (this being equal to $3 \times 3.8 =$ 11.4 mc.) the required band width of the transmitter, for faithful reconstruction of the information carried by the pulses would necessarily be one-half of 11.4 or 5.7 mc. Since the transmitter channel is only 4.2 mc. wide considerable crosstalk would have to be tolerated. In Figure 8, however, the sampling rate is made 2.8 mc. which provides a pulse rate of 8.4 mc. ($3 \times 2.8$ mc.$=8.4$ mc.). Since one-half of 8.4 is 4.2, the 4.2 mc. band width of the transmitter 132 is obviously adequate and no cross talk need be tolerated. Also in Figure 8 the high frequency cut off of the low pass amplifier 112, 114 may be accordingly made to be one-half the sampling rate of 2.8 mc. or 1.4 mc. Moreover, since the sampling rate of 2.8 mc. is employed, thereby reducing crosstalk over the transmission channel itself, a change in relationship of the high frequency passed by the image detail high pass amplifier relative to the sampling rate must be made. As pointed out, hereinbefore, it is sometimes desirable to keep the highest image detail frequency transmitted, below that of the receiver sampling rate. However, in the case of Figure 8, this would be impractical since it would restrict image detail signal components to a value below 2.8 mc. It is, therefore, seen that in causing high pass amplifier 128 to operate over a band of 1.4 to 4.2 mc. a compromise has been made between the generation of unwanted low frequency beats in the receiver commutator (between 2.8 mc. and image detail frequency ranging from nearly 2.8 to 4.2 mc.) and the provision of a transmission channel theoretically free from crosstalk. In practice, it may be desirable to slightly increase the sampling rate above 2.8 mc., but yet below the 3.8 mc. rate hereinbefore shown, while reducing the high pass frequency of the high pass amplifier 128 to a value more closely equal to the sampling rate but still in excess thereof. As pointed out above in reference to other low frequency distortion components, experience has shown that the use of line or dot interlace greatly reduces any deleterious effects of such low frequency components. Another compromise which must be made to provide the crosstalk free system of Figure 8 is of course the increase in the coarseness of the pattern produced by the kinescopes in the receiver. This means that unless other corrective measures are taken the reproduced image of the 2.8 mc. sampling rate arrangement will necessarily have to be viewed at a greater distance than the 3.8 mc. sampling rate system in order to render the dot pattern undetectable by the eye.

Figure 9:
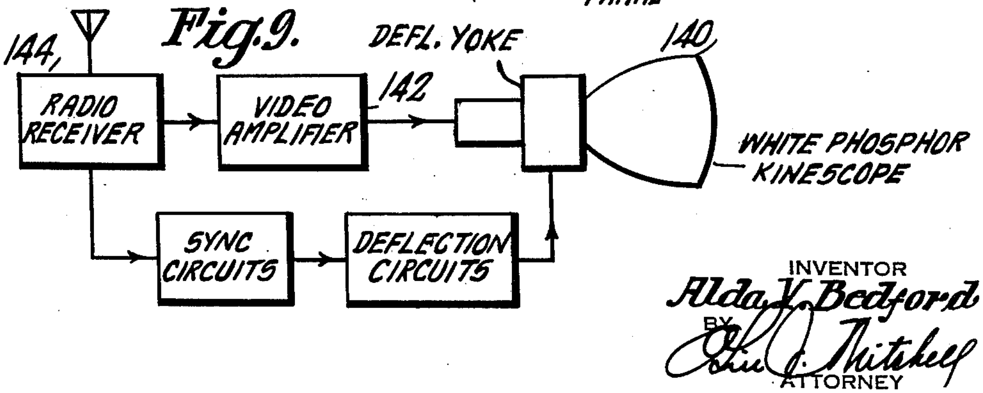
Figure 9 illustrates in block form a typical black and white television receiving system which evidences in monochromatic form the improvements in the color signal characteristics produced by transmission systems embodying the novel features of the present invention.

All of the arrangements shown in Figures 1, 6, 7 and 8 are of course fully compatible with existing black-and-white receivers, a typical example of which is shown in Figure 9. The dot pattern produced by the commutation in the transmitter will, naturally be reproduced to some extent on the face of the black-and-white kinescope 140 fed by the video amplifier 142 and receiver 144. However, the higher the sampling rate employed the less visible will be this dot pattern structure and the less objectionable it will be. Again a compromise must be made between the coarseness of the dot pattern and the degree of crosstalk permisibly tolerated as produced over the restricted 4.2 mc. transmission channel.

It is to be further understood that although the lower frequency limit of band pass circuits shown in the above described embodiments of the invention has been indicated as zero cycles per second, this lower frequency limit will in practice be in the order of 60 cycles or so. Zero cycle response, corresponding to direct coupled amplifier circuits, may of course be simulated through the use of conventional direct current restorer arrangements for the video channels. Moreover, although the symbolic representations of the time multiplexing transmitter commutator device and receiver signal distributing commutating device used in the above description of the present invention is suggestive of a mechanical arrangement, it will be understood that such commutation arrangements may take a variety of well known forms, either mechanical or electronic. Inasmuch as rather high signal sampling or commutation rates are involved, it is evident that the signal sampling is best accomplished by electronic means, examples of which in addition to a particular arrangement for obtaining line element interlace is shown and described in the above-referenced U. S. patent application by Randall Ballard, Serial No. 117,528, filed September 24, 1949, entitled "Color Television Systems." Other suitable signal commutation arrangements for time division multiplexing in accordance with the present invention are shown and described solely by way of example in U. S. Patent No. 2,048,081, issued July 21, 1936, to Alger S. Riggs, entitled "Communication System," and also in U. S. Patent No. 2,041,245, issued May 19, 1936, to P. M. Haffcke, entitled "Wave Signalling Method and Apparatus." It is to be understood that it may, in certain instances, be desirable to modify these exemplary commutation arrangements to more completely serve the interests of the present invention, but such modifications are well within the scope of those skilled in the art.

Having thus described my invention, what is claimed is:

1. In a color television transmitter employing a plurality of color channels each containing a respective set of color signals divisible into high and low frequency signal components, the combination comprising, means for successively sampling during sampling intervals of a predetermined duration and occurring at a predetermined sampling rate the individual low frequency component output of each of said sets of color signals to produce a series of output pulses each pulse substantially corresponding to low frequency color information of a respective color signal, a signal adding circuit, means for applying both said series of color information pulses and the high frequency components of at least one of said color channels to said signal adding circuit for combining therein and means for applying the output of said adding circuit to the input of a color television signal transmission circuit.

2. In a color television transmitter employing a plurality of color channels each containing a respective set of color signals divisible into high and low frequency signal component, the combination comprising, means for successively sampling during predetermined sampling intervals of a predetermined duration and occurring at a predetermined sampling rate the individual low frequency component output portion of each of said sets of color signals to produce a series of output pulses each pulse substantially corresponding to low frequency color information of a respective color signal, signal separating means for extracting high frequency signal components from at least one of said color channels to form an image detail signal, a transmission circuit connected with the output of said sampling means, and means connected with said sampling means and the output of said extracting means for adding said image detail signal to said transmission circuit at least during said predetermined sampling intervals.

3. In a color television transmitter employing a plurality of color representative signals, the combination comprising, means for separating at least one of said color signals into high and low frequency signal components, means for communicating only the low frequency components of color signals not undergoing said frequency separation, means for successively sampling during sampling intervals of predetermined sequence, duration and frequency, the low frequency signal components appearing at both the output of said frequency separating means and said low frequency communicating means thereby to produce a series of output pulses, each pulse corresponding to low frequency color information of a respective color channel, signal adding means connected with said sampling means, and connections for applying said high frequency components to said signal adding means such that said high frequency components are added to said series of output pulses at least during intervals corresponding to the durations of said output pulses.

4. Apparatus according to claim 3 wherein there is additionally provided circuit means for limiting the highest high frequency component applied to said adding means to a value below the value of the sampling means sampling frequency.

5. Apparatus according to claim 4 wherein the color television transmission system over which said sampling means output pulses are to be communicated has a predetermined upper cutoff frequency limit and wherein the sampling rate of said sampling means is in excess of two-thirds the value of said transmission system upper cutoff frequency limit.

6. Apparatus according to claim 3 wherein said frequency separating means is adapted to provide a low frequency component separation whose highest component frequency is less than the sampling means sampling frequency.

7. Apparatus according to claim 3 wherein the sampling rate provided by said sampling means is adjusted to be less than the highest high frequency color channel component applied to said signal adding means.

8. In a color television transmitter employing a plurality of color channels each containing a respective set of color signals, the combination comprising, means for dividing a plurality of said sets of color signals into high and low frequency signal components, means for communicating only the low frequency components of color channels not undergoing said frequency division, means for successively sampling during sampling intervals of predetermined sequence, duration and frequency, the low frequency signal components appearing at both the output of said frequency dividing means and said low frequency communicating means thereby to produce a series of output pulses each pulse corresponding to low frequency color information of a respective color channel, means for combining the high frequency signal components to produce an image detail signal, signal adding means connected with said sampling means, and connections applying said image detail signal to said signal adding means such to superimpose said image detail signal on said series of sampling means output pulses.

9. Apparatus according to claim 8 wherein said frequency dividing means is adapted to provide a low frequency component division whose highest component frequency is less than the sampling means sampling frequency.

10. Apparatus according to claim 8 wherein the sampling rate provided by said sampling means is adjusted to be less than the highest high frequency color channel component applied to said signal adding means.

11. In a color television transmitter employing a plurality of color channels, the combination comprising, means for dividing at least one of said color channels into high and low frequency signal components, means for communicating only the low frequency components of color channels not undergoing said frequency division, means for successively sampling during sampling intervals of predetermined sequence, duration and frequency, the low frequency signal components appearing at both the output of said frequency dividing means and said low frequency communicating means thereby to produce a series of output pulses each corresponding to low frequency color information of a respective color channel, a signal transmission circuit, signal adding means connected between the output of said sampling means and the input of said signal transmission circuit, and connections applying said divided high frequency components to said signal adding means for adding said high frequency components to the series of sampling device output pulses applied to said transmission circuit.

12. In a color television transmitter employing a plurality of color channels, the combination comprising, means for separating at least one of said color channels into high and low frequency signal components, means for communicating only the low frequency components of color channels not undergoing said frequency separation, means for successively sampling during sampling intervals of predetermined sequence, duration and frequency, the low frequency signal components appearing at both the output of said frequency separating means and said low frequency communicating means thereby to produce a series of output pulses each corresponding to low frequency color information of a respective color channel, signal adding means connected between said frequency separating means low frequency output and said sampling means input of at least one color channel, signal adding means connected between the output of said low frequency communicating means and said sampling means input of at least one color channel, and connections applying said high frequency component to all said signal adding means for adding said high frequency components to the output pulses of said sampling device during intervals corresponding to the durations of said sampling pulses.

13. In a color television transmitter employing a plurality of color channels, the combination comprising means for separating a plurality of said color channels into high and low frequency signal components, means for communicating only the low frequency components of the color channels not undergoing said frequency separation, means for successively sampling during sampling intervals of predetermined sequence, duration and frequency, the low frequency signal components appearing at both the output of said frequency separating means and said low frequency communicating means thereby to produce a series of output pulses each corresponding to low frequency color information of a respective color channel, means for combining the high frequency signal components to produce an image detail signal, signal adding means connected between said frequency separating means low frequency output and said sampling means input of at least one color channel, signal adding means connected between the output of said low frequency communicating means and said sampling means input of at least one color channel, and connections applying said image detail signal to all said signal adding means such to superimpose said image detail signal on each of the sampling means output pulses.

14. In a color television transmitter employing a green, red and blue color channel the combination comprising means for dividing at least the green color channel into high and low frequency signal components, means for communicating only the low frequency components of color channels not undergoing said frequency division, means for successively sampling during sampling intervals of predetermined sequence, duration and frequency, the low frequency signal components appearing at both the output of said frequency dividing means and said low frequency communicating means thereby to produce a series of output pulses each corresponding to low frequency color information of a respective color channel, signal adding means connected with said sampling means, and connections applying at least said green channel high frequency components to said signal adding means such that said green high frequency components are imposed on said sampling device output pulses at least during intervals corresponding to the duration of said sampling pulses.

15. Apparatus according to claim 14 wherein said frequency dividing means embraces said red channel as well as said green channel and wherein there is additionally provided means for combining the red high frequency components with said green high frequency components in their application to said signal adding means.

16. In a television transmitter the combination of a signal channel, means for separating said signal channel into high and low frequency components, a signal sampling means for periodically sampling during predetermined sampling intervals of a given duration and frequency the low frequency signal components into which said signal channel is separated, a signal adding means, and connections for applying both the output of said signal sampling means and said signal channel high frequency components to the input of said signal adding means.

17. In a color television transmitter employing a plurality of color channels, the combination comprising, means for separating at least one of said color channels into high and low frequency signal components, means for communicating only the low frequency components of color channels not undergoing said frequency separation, means for successively sampling during sampling intervals of predetermined sequence, duration and frequency, the low frequency signal components appearing at both the output of said frequency separating means and said low frequency communicating means thereby to produce a series of output pulses, which pulses are in turn divisible into color groups each color group embracing an equal number of pulses, the amplitude variations of each pulse in a given color group corresponding to low frequency amplitude variations of a different color channel, a plurality of said color groups being further grouped to form line information units defining the color representations for successive line scansions by an image reproducing cathode ray tube, means for periodically shifting the phase of said sampling means sampling action relative to image scansion so as to shift the phase of predetermined line information units relative to one another, signal adding means connected with said sampling means, and connections for applying said high frequency components to said signal adding means such that said high frequency components are added to said series of output pulses at least during intervals corresponding to the durations of said output pulses.

18. Apparatus according to claim 17 wherein said sampling means phase shifting means is such to provide that periodic phase shift required to alternately interlace the pulse information of one line information group, along a given raster line, with the pulse information of the next line information group applied to said given raster line.

19. In a color television transmitter employing a plurality of color channels each containing a respective set of color signals, means for deriving low frequency signal components from the sets of color signals, the combination comprising means for successively sampling during sampling intervals of a predetermined duration and occurring at a predetermined sampling rate the individual low frequency components of the sets of signals to produce a multiplex color signal, a signal adding circuit, means for applying both said multiplex color signal and at least a portion of other frequency components of at least one of said color channels to said signal adding circuit for combining therein, and means for applying the output of said signal adding circuit to the input of a signal transmission circuit.

20. In a television transmitter the combination of a signal channel containing a set of color signals, means for deriving low frequency components from the color signals, a signal sampling system for periodically sampling during predetermined sampling intervals of a given duration and frequency such low frequency signal components and means for combining signal variations produced by said signal sampling means with signal variations directly obtained from said signal channel so as to produce a composite signal representing sampled and unsampled aspects of the signal channel.

21. In a color television transmitter employing a plurality of sets of color signals, the combination comprising sources of color signals representative of different color components, filter means for selecting a series of low-frequency components from each of a plurality of said color signals, an output device, means for cyclically varying the transmission of each of said series of low-frequency components to said output device at a frequency exceeding the highest frequency of said low-frequency components, the cyclic variation of transmission being in different time phases for the different sets of color signals, means for deriving an image detail signal comprising at least portions of the high-frequency components of a plurality of said sets of color signals and means for conducting said image detail signal to said output device.

22. In a color television transmitter employing a plurality of sets of color signals, the combination comprising sources of sets of color signals representing different color components of a color image, filter means for deriving a series of low-frequency components from each of a plurality of said sets of color signals, modulation means for effectively cyclically varying the efficiency of transmission of each of said series of low-frequency components at a frequency higher than the effective pass band of said filter means, the cyclic variations of said modulation means occurring in different time phases for the different sets of color signals, means for deriving an image detail signal containing at least some high-frequency components of a plurality of said sets of color signals, and means for additively combining said image detail signal and at least a portion of the outputs of said modulation means.

23. In a color television transmitter, the combination of devices for producing a plurality of sets of signals representative of different component colors of an image being transmitted, a separate low-pass circuit associated respectively with each of the devices for rejecting the higher frequency portions of the sets of signals, said low-pass circuits being in separate signal channels and having separate output connections, a signal combining circuit, channel selector apparatus cooperating with the output connections of the low-pass circuits at respectively different phases of the operation of the selector apparatus, said selector apparatus including at least one output connection from the selector apparatus to the signal combining circuit, other connections for conducting at least the higher frequency portions of one of the sets of signals around at least one of the low-pass circuits and the selector apparatus to the signal combining circuit, either said selector apparatus or said other connections being constructed so as not to pass frequencies in the range passed by said low-pass circuits.

24. In a color television transmitter, the combination of devices for producing independent sets of signals representative respectively of different component colors of an image being transmitted, a separate low-pass circuit associated respectively with each of the devices for rejecting the higher frequency portions of the sets of signals, said low-pass circuits having separate output connections, a signal combining circuit, cyclic selector apparatus cooperating with the output connections of the low-pass circuits at respectively different phase angles of the cyclic selector apparatus, said selector apparatus including an output connection from the apparatus to the signal combining circuit, other connections for combining a plurality of sets of signals and conducting at least their higher frequency portions around certain of the low-pass circuits and the selector apparatus to the first-mentioned signal combining circuit, either said cyclic selector apparatus or said other connections being constructed so as not to pass frequencies in the range passed by said low-pass circuits.

25. In a color television transmitter, the combination of camera devices for producing independent sets of signals representative respectively of different component colors of an image to be transmitted, low-pass circuits associated respectively with each of the devices for rejecting the higher frequency portions of the sets of signals and reducing the frequency band necessary to transmit them, sampler apparatus operating at a substantially fixed frequency higher than the frequency pass-band of the low-pass circuits and having a plurality of input electrodes corresponding to said devices, connections between each of the low-pass circuits and a respective one of the sampler input electrodes, so that the sampler output contains both the frequencies passed by said filters and sideband components resulting from modulation of the sampler frequency by said last-mentioned frequencies, other connections for combining a plurality of the sets of signals and conducting at least their higher frequency portions around at least certain of the low-pass circuits and the sampler apparatus, and a device in either said sampler output or said other connections for rejecting frequencies in the range passed by said low-pass circuits.

26. In a color television transmitter the combination of devices for producing a plurality of sets of signals representative of different component colors of an image being transmitted, low-pass circuits for rejecting higher frequency portions of the sets of signals and reducing the frequency band required to transmit them, a signal combining circuit, sampler apparatus operating substantially at a predetermined frequency and having a plurality of input electrodes corresponding to said devices, connections between each of the low-pass circuits and a respective one of the sampler input electrodes, at least one output connection from the sampler apparatus to the signal combining circuit, other connections for conducting at least the higher frequency portions of one of the sets of signals around at least one of the low-pass circuits and the sampler apparatus to the signal combining circuit, and a device in either said sampler apparatus output connection or said other connections for rejecting frequencies in the range passed by the low-pass circuits.

27. In a color television transmitter, the combination of devices for producing a plurality of sets of signals representative respectively of different color components of an image being transmitted, low-pass circuits associated with the devices for rejecting the higher frequency components of the sets of signals, a signal combining circuit, means for generating a reference wave, means for utilizing said reference wave to derive a plurality of signals dependent in amplitude upon the respective amplitudes of the signal outputs from the low-pass circuits and corresponding respectively in phase to different phases of the reference wave, means for conducting said derived signals from the utilizing means to the signal combining circuit, means for developing a series of image detail signals comprising at least portions of the high-frequency components of at least one of said sets of color signals, and connections for conducting said image detail signal to said signal combining circuit in shunt to the utilizing means.

28. Apparatus according to claim 27 in which either the conducting means for the derived signals or said connections are constructed so as not to pass signals of frequencies in the range passed by said low-pass circuits.

29. In a color television transmitter, the combination of devices for producing different sets of signals, a plurality of which are representative respectively of different color components of an image being transmitted and includes low frequency components, a signal combining circuit, means for generating a reference wave, means for utilizing said reference wave to derive a plurality of signals dependent in amplitude upon the respective amplitudes of the low frequency components of different sets of color signals and corresponding respectively in phase to different phases of the reference wave, means for conducting said derived signals for the utilizing means to the signal combining circuit, means for developing a series of image detail signals comprising at least portions of the high-frequency components of at least one of said sets of signals, and connections for conducting said image detail signals to said signal combining circuit in shunt to the utilizing means.

30. In a color television transmitter, the combination of devices for producing a plurality of sets of signals representative respectively of different color components of an image being transmitted, low-pass circuits associated with the devices for rejecting the higher frequency components of the sets of signals, a signal combining circuit, means for generating a reference wave, means for utilizing said reference wave to derive a plurality of signals dependent in amplitude upon the respective amplitudes of the signal outputs from the low pass circuits and corresponding respectively in phase to different phases of the reference wave, said utilizing means including at least one output connection to the signal combining circuit, other connections for combining a plurality of the sets of signals and conducting at least portions of their high frequency components around certain of the low-pass circuits and the utilizing means to the signal combining circuit, either said utilizing means or said other connections being constructed so as not to pass frequencies in the range passed by said low-pass circuits.

References Cited in the file of this patent

UNITED STATES PATENTS

| Number | Name | Date |
|---|---|---|
| 2,041,245 | Haffcke | May 19, 1936 |
| 2,048,081 | Riggs | July 21, 1936 |
| 2,272,638 | Hardy | Feb. 10, 1942 |
| 2,333,969 | Alexanderson | Nov. 9, 1943 |
| 2,335,180 | Goldsmith | Nov. 23, 1943 |
| 2,359,637 | Goldsmith | Oct. 3, 1944 |
| 2,461,515 | Bronwell | Feb. 15, 1949 |
| 2,539,440 | Labin | Jan. 30, 1951 |
| 2,554,693 | Bedford | May 29, 1951 |
| 2,558,489 | Kalfaian | June 26, 1951 |
| 2,580,903 | Evans | Jan. 1, 1952 |